United States Patent
Spies

(10) Patent No.: US 6,606,845 B1
(45) Date of Patent: Aug. 19, 2003

(54) HAND-OPERATED LAWN MOWER WITH MOTOR

(75) Inventor: Walther Spies, Siegen (DE)

(73) Assignee: Wolf-Garten GmbH & Co. KG (DE)

( * ) Notice: Subject to any disclaimer, the term of this patent is extended or adjusted under 35 U.S.C. 154(b) by 0 days.

(21) Appl. No.: 09/806,219
(22) PCT Filed: Sep. 17, 1999
(86) PCT No.: PCT/EP99/06880
§ 371 (c)(1), (2), (4) Date: May 15, 2001
(87) PCT Pub. No.: WO00/18213
PCT Pub. Date: Apr. 6, 2000

(30) Foreign Application Priority Data

Sep. 28, 1998 (DE) .......................... 198 44 439

(51) Int. Cl.⁷ .............................. A01D 34/03
(52) U.S. Cl. ........................ 56/16.7; 56/320.2
(58) Field of Search ................ 56/16.9, 17.1, 56/17.2, 17.5, 16.7, 320.1, 320.2; 172/40, 42

(56) References Cited

U.S. PATENT DOCUMENTS

| 2,263,368 A | 11/1941 | Sejkora |
| 2,265,545 A | 12/1941 | Phelps |
| 3,292,351 A | * 12/1966 | Larson et al. ................ 56/17.2 |
| 3,537,720 A | 11/1970 | Irgens |
| 3,603,162 A | * 9/1971 | Gohler ........................ 172/108 |
| 3,680,295 A | 8/1972 | Rutherford |
| 4,422,283 A | 12/1983 | Scanland |
| 4,711,077 A | * 12/1987 | Kutsukake et al. .......... 56/17.5 |
| 4,835,952 A | * 6/1989 | McLane .................. 280/43.13 |
| 4,942,726 A | * 7/1990 | Bowditch ................ 280/43.13 |

FOREIGN PATENT DOCUMENTS

| DE | 3614285 | 10/1986 |
| EP | 0193186 | 9/1986 |
| GB | 905812 | 9/1962 |

* cited by examiner

Primary Examiner—Robert E. Pezzuto
(74) Attorney, Agent, or Firm—Ostrolenk, Faber, Gerb & Soffen, LLP

(57) ABSTRACT

A plurality of modular-construction hand-operated motorized devices, including a lawn mower, a verticutting implement, a sweeping device, and a device for loosening the soil or taking in and blowing out leaves are disclosed. Each device includes a limited number of differently designed and dimensioned main and additional modules which provide for a wide range of individually adapted types of devices to be constructed.

12 Claims, 5 Drawing Sheets

HAND-OPERATED LAWN MOWER WITH MOTOR

BACKGROUND OF THE INVENTION

The hand-operated motorized lawn mowers currently available for gardening have a self-supporting chassis which, as the central element, absorbs all the operating forces and on which all the add-on parts are fastened. The manufacturer supplies these lawn mowers in a small number of predetermined variations, which differ essentially only in respect of their cutting width and their drive. The individual mass-produced types of mower are adapted more or less to the requirements and the wishes of the consumers and are equipped either with an internal combustion engine or with an electric motor with mains connection or storage-battery operation, it obviously being necessary for the power of the motors to be adapted to the cutting width. Once the customer has bought a lawn mower of a certain type, it is no longer possible to make any changes, in particular in respect of power and cutting width. If the customer was mistaken in respect of the set-up which is optimal for his/her requirements, or there was a change in requirements on account of a newly acquired surface area requiring cutting, this change could only be taken into account by a new type of mower, accordingly better adapted to the requirements, being bought. Even with damage to a part, for example the chassis, or with failure of a functional element, repair of the conventional mass-produced lawn mowers was not economically viable, with the result that, in this case too, it was necessary to make a new purchase.

On the other hand, the types of lawn mower brought out in a small number of predetermined series allowed rational semi-automatic production, which had a favorable effect on the price for the consumer.

In contrast to the abovemetioned lawn movers, in which there is provided a rigid chassis which accommodates the running wheels and bears the add-on parts fastened rigidly on it, U.S. Pat. No. 3,537,720 has disclosed a lawn mower in which two wheel-support frames are mounted such that they can be moved to a limited extent with one another and with the add-on parts. In this case, two lateral frame parts which accommodate the running wheels are connected to a transversely running rear wall via articulation elements, and the cutting-unit hood, which bears the motor, is connected to the lateral frame parts via two further articulation elements. This is intended to achieve the situation where, in the case of uneven terrain, all the wheels remain in contact with the ground. As a result, it is intended for the gap between the mower and the ground to be kept small in order to prevent stones or the like which are slug out by the cutting blades from escaping in the outward direction and causing injuries. This risk of hard objects being slug out is intended to be prevented by a trailing roller rolling on the ground, as a result of which the gap, which is open to the rear, is covered in its entirety. In this specific construction, this known mower is obviously mass-produced. Modifications are not provided.

A lawn mower designed in modular fashion in accordance with the generic type is known from EP-A-0 193 186. This lawn mower has, as its main module, a core part onto which it is possible to add, in the direction of travel of the lawn mower, front and rear additional housing parts which bear the running wheels. This is intended to make it possible for one and the same additional part containing, for example, the wheels and the handle to be combined with different core parts, for example with larger and/or wider core parts.

U.S. Pat. No. 2,265,545 discloses a lawn mower with a rigid frame with a motor bearing and axle bearings and an articulated guide bar and with a running gear, a motor unit and a cutting unit. For the purpose of space-saving dispatch from the factory to the customer or store owner, these various parts are intended to be packaged separately from one another and to be assembled only at the intended destination. Different possible combinations are not provided here.

A lawn mower which may optionally be equipped with different additional parts, e.g. with rigid or articulated handles or either adjustable or fixed wheels, is known from U.S. Pat. No. 4,422,283.

BRIEF SUMMARY OF THE INVENTION the object of the invention is to provide a modular-construction hand-operated motorized lawn mower which, in conjunction with a limited number of differently designed and/or dimensioned main and additional modules, makes it possible for a wide range of individually adapted types of lawn mower to be constructed and made available at a reasonable price.

The set object is achieved by the features specified in the defining part of patent claim 1.

It is possible in the same way to construct, in modular fashion, a hand-operated motorized verticutting implement according to patent claim 2, a hand-operated motorized sweeping device according to patent claim 3 or a hand-operated motorized device for loosening the soil or for taking in and blowing out leaves according to patent claim 4.

Since the rigid frame may be designed in a comparatively straightforward manner such that, without any damage being caused, it absorbs all the loading occurring in unusual operating states, optimum adaptation to lawn mowers of different sizes and/or powers.

Despite the variety of different types of lawn mower which are to be produced in a customer-specific manner, cost-effective production can take place in a manner known per se in that, with computer aid, on a production line, the respectively necessary modules are fed and fitted, if appropriate, automatically.

Further configurations of the invention can be gathered from the subclaims. A suitable running gear, in general, is a double-axle running gear with four wheels which are arranged in a manner known per se such that they can be height-adjusted together, via an adjusting lever, in order for it to be possible for the operating height to be adjusted. Instead of the rear wheels, it is also possible for a running roller to be arranged in a module of corresponding design. The invention also makes it possible, instead of the cutting unit for lawn-mowing purposes, to arrange other tool subassemblies, for example verticutting blades or a device for loosening the soil or else a device for sweeping together or for taking in and blowing out, for example, leaves.

BRIEF DESCRIPTION OF THE DRAWINGS

Exemplary embodiments of the invention are described a hereinbelow with reference to the drawing, in which.

DETAILED DESCRIPTION OF THE INVENTION

Figure 1:
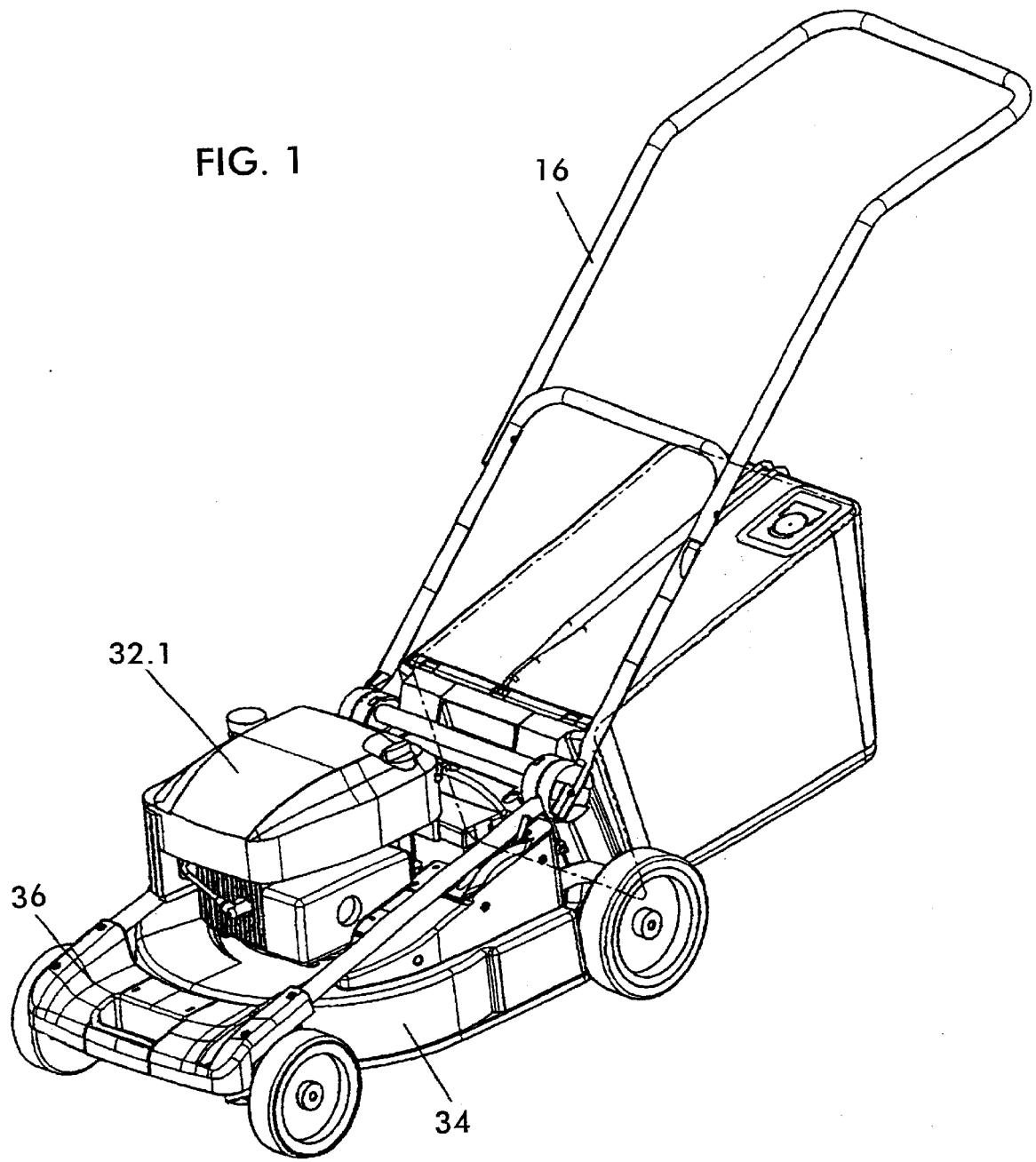
FIG. 1 shows a perspective view of a lawn mower designed in modular fashion according to the invention.
Figure 2:
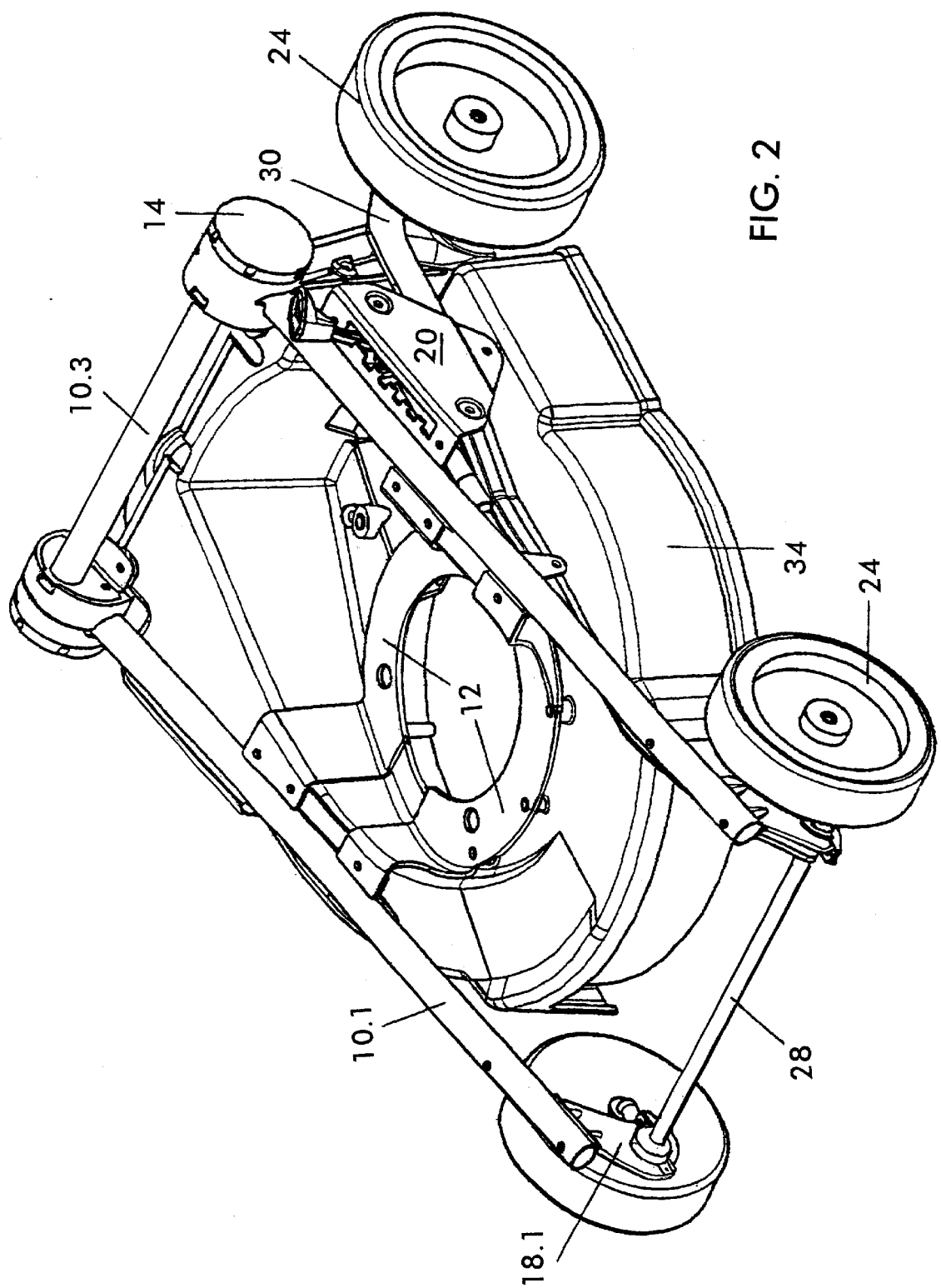
FIG. 2 shows the lawn mower according to FIG. 1 in a partly assembled state.
Figure 3:
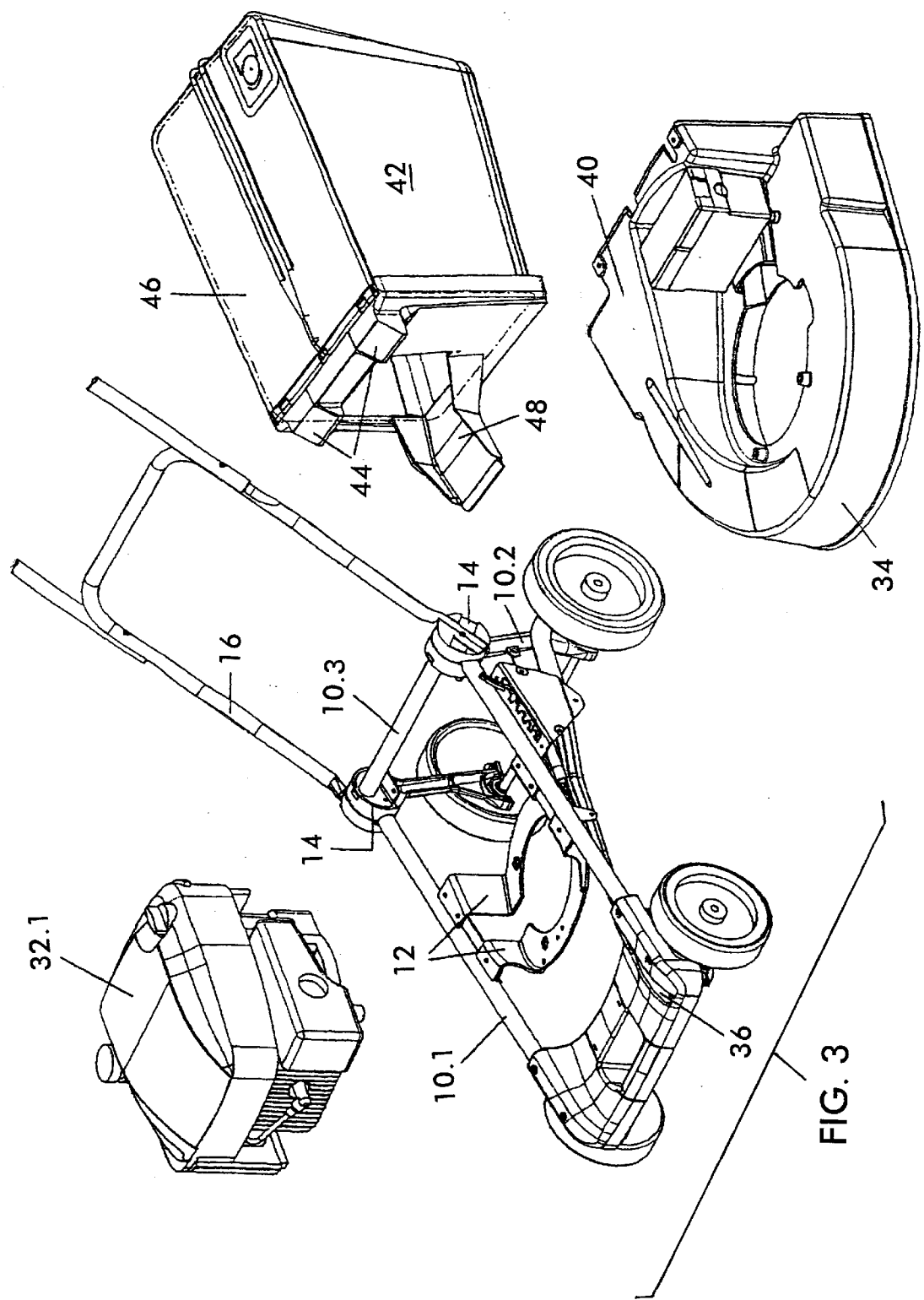
FIG. 3 shows a perspective illustration of individual modules from which the lawn mower according to FIG. 1 is assembled.
Figure 4:
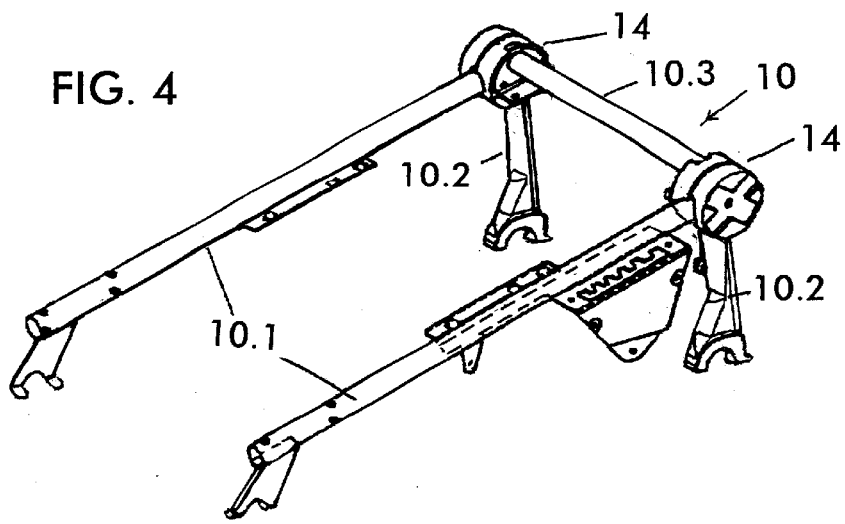
FIG. 4 shows a perspective view of a modular-construction rigid frame.
Figure 5:
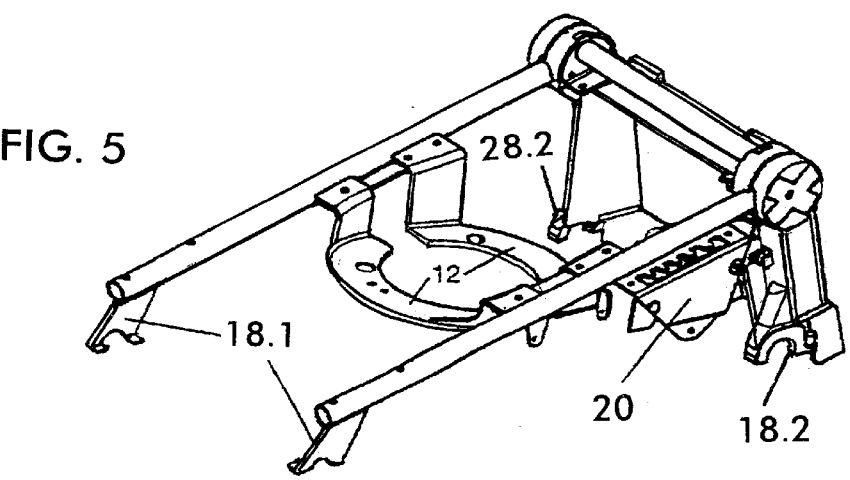
FIG. 5 shows a perspective view of the frame according to FIG. 4 with motor supports inserted.

In order to explain the basic construction, you are referred first of all to FIGS. 3 to 7. The load-bearing element provided is a double delta frame 10 which comprises two longitudinal supports 10.1 which slope up obliquely from front to rear, two rear supports 10.2 which are connected rigidly to the longitudinal supports and slope down steeply in the rearward direction, and a rear connecting tube 10.3. This frame 10 may be used as a basic element for all the different types of lawn mower; however, it is also intended to reserve for the invention the possibility of providing different frame dimensions, it being possible for the frame, for its part, to be designed in modular fashion.

A motor bearing 12 in the form of arcuately curved rigid load-bearing plates is suspended on the longitudinal supports 10.1. Pivot bearings 14 for the guide bar 16 are arranged at the rigid connection between the longitudinal supports 10.1 and the rear supports 10.2, it being possible for the guide bar 16 to be pivoted about said pivot bearings and to be secured in each angular position in a manner known per se. The free ends of the longitudinal supports and rear supports are provided with axle bearings 18.1 and 18.2. One of the longitudinal supports, moreover, bears a latching-adjustment mechanism 20 for the cutting-height adjustment.

Figure 6:
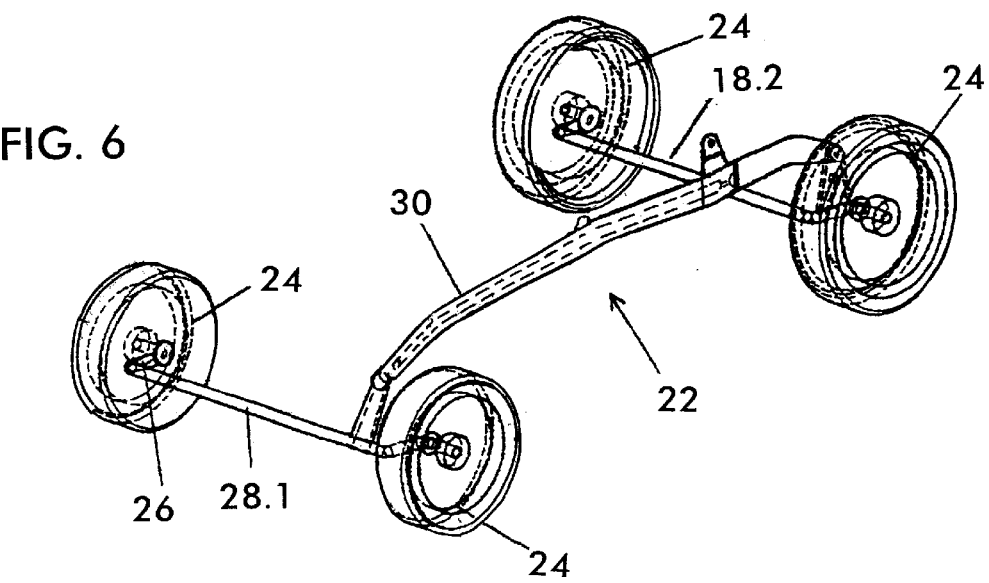
FIG. 6 shows a perspective illustration of a modular system with four running wheels, axles and a connecting rod for operating height adjustment.
Figure 7:
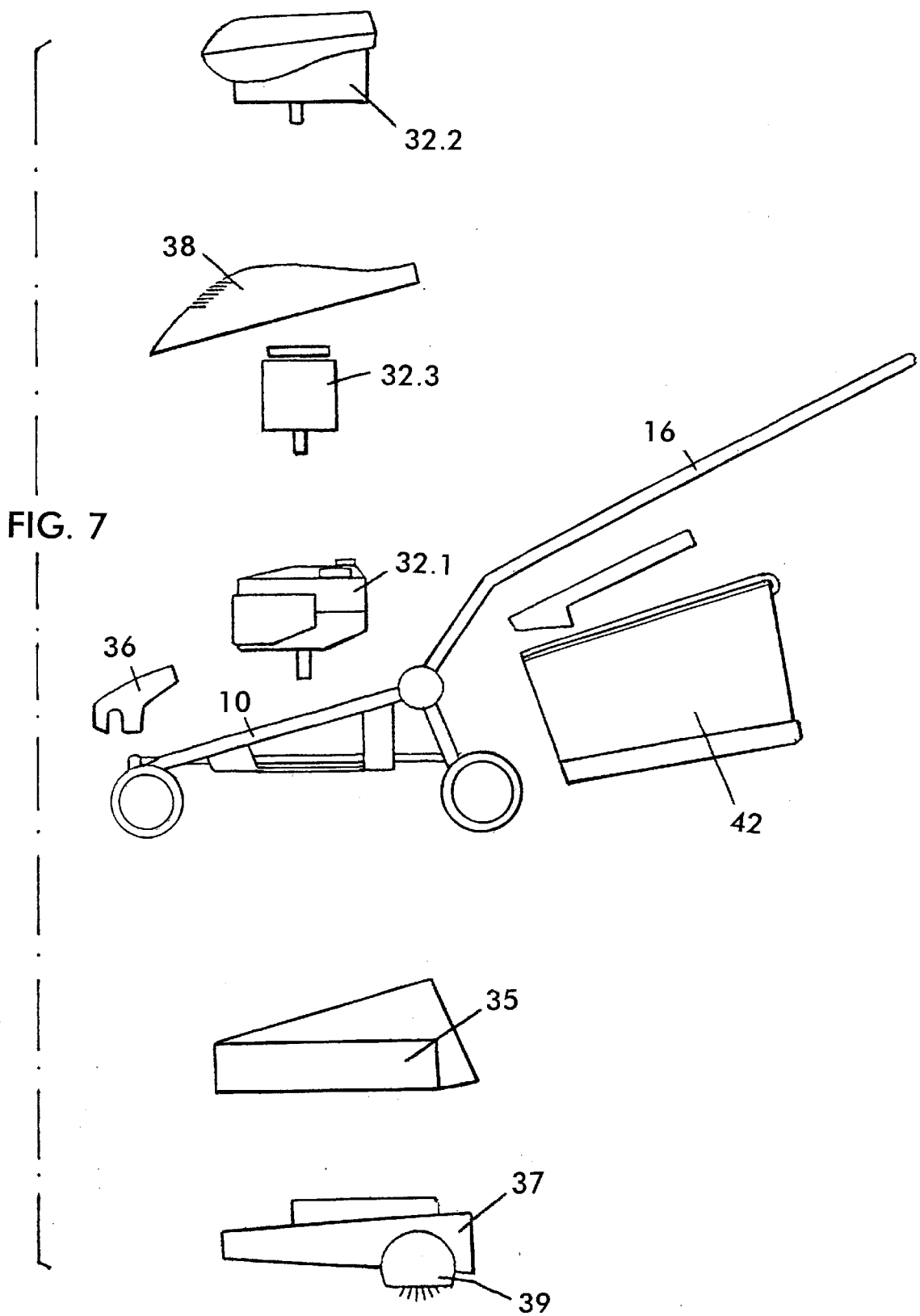
FIG. 7 shows a schematic illustration of modules which can be assembled in different ways.

FIG. 6 shows the running-gear and height-adjustment system 22 designed in the form of a module. According to the exemplary embodiment illustrated, the running gear has four running wheels 24, of which the axle journals are connected in pairs, via radially running arms 26, to in each case one axle 28.1, 28.2. These axles are mounted rotatably in the axle bearings 18.1, 18.2. The cutting height can be adjusted by rotation of the axle-bearing rod 28.1, 28.2 in its bearings 18.1, 18.2. A simultaneous adjustment of the cutting height of the front wheels and rear wheels is effected by a link mechanism 30 which can be transferred into operative connection with the latching-adjustment mechanism 20.

A motor unit can be firmly screw-connected to the motor bearing 12. This motor unit may be designed as an internal combustion engine 32.1, as a storage-battery motor unit 32.2 or as an electric motor 32.3. The output shaft of the motor unit 32 bears the cutting unit (not illustrated in the drawing).

A hood 34 is secured on the frame 10. A front apron 36 which is designed in the form of a module and can be secured on the frame, or is connected to the hood 34, covers over the front-wheel suspension in the assembled state. It is possible for this hood 34 and the front apron 36 as well as a covering 38 which may additionally be provided for the motor unit, since they do not have to transmit any substantial forces, to be produced from relatively thin sheet-metal or plastic material. As can be seen, in particular, from FIG. 3, the hood 34 is equipped with air-channeling and/or grass-channeling passages 40. The grass-collecting container 42 is designed as a further module, and this container can be fitted in in the rear region by means of its front hooks 44 and projects into the chaneling passage 40 by way of a guide plate 48 when the collecting container 42 is fitted on the frame 10. The collecting container is provided with a pivotably articulated flap 46.

The cutting unit (not illustrated in the drawing) may be designed as a blade which circulates in a horizontal plane and is fixed to the motor output shaft or can be coupled thereto as a module. This cutting unit, for its part, may be supported in a manner known per se by a bearing which is connected to the motor bearing 12. Instead of the cutting unit, it is also possible for other tool subassemblies to be secured on the motor bearing 12 either in combined form with their drive motor or such that they can be coupled, as a module, to any desired drive motor. These operating subassemblies may be, for example, a verticutting arrangement, a sweeping device, a blower or some other device.

LIST OF DESIGNATIONS

10 Double delta frame
10.1 Longitudinal support
10.2 Rear support
10.3 Rear connecting tube
12 Motor bearing
14 Pivot bearing
16 Guide bar
18.1 Axle bearing front
18.2 Axle bearing rear
20 Latching-adjustment mechanism
22 Running gear
24 Running wheels
26 Radial arms
28.1 Axle front
28.2 Axle rear
30 Link mechanism
32.1 Internal combustion engine
32.2 Storage-battery motor unit
32.3 Electric motor
34 Hood
35 Cutting unit
36 Front apron
37 Verticutting unit
38 Covering
39 Sweeping unit
40 Air-channeling/grass-channeling passages
42 Grass-collecting container
44 Front hook
46 Flap
48 Guide plate

What is claimed is:

1. A modular-construction hand-operated motorized lawn mower, comprising a main module comprising a rigid frame with a motor bearing, axle bearings and an articulated guide bar, said frame having two longitudinal supports which slope up from front to rear, two rear supports which slope steeply in the downward direction from the rear end of the longitudinal supports, and a rear connecting tube which connects to a plurality of connecting locations of the longitudinal and rear supports, the motor bearing being suspended on the longitudinal supports; and additional modules which can be fitted and removed individually, wherein at least the following additional modules can be added on to the rigid frame:

a running gear which can be connected to the rigid frame by means of the axle bearings;

a motor unit as drive module;

a cutting unit;
a hood with an air-stream guide as a channeling system;
and wherein the above-mentioned modules can be combined with one another in an exchangeable manner in different predetermined dimensions and in different constructions.

2. The motorized lawn mower as claimed in claim 1, wherein a grass-collecting container may be provided as an additional module.

3. The motorized lawn mower as claimed in claim 1, wherein the drive module provided is an internal combustion engine, an electric motor or a storage-battery motor unit.

4. The motorized lawn mower as claimed in claim 1, wherein, on the main module, the front ends of the longitudinal supports are connected to one another by a front apron.

5. The motorized lawn mower as claimed in claim 1, wherein the running gear has wheels which are mounted on axle journals, the latter being connected in pairs, via radial arms, to two axles which are mounted rotatably in the axle bearings.

6. The motorized lawn mower as claimed in claim 5, wherein the axles are connected by a link mechanism which interacts with a latching-adjustment mechanism of the frame in order to effect a synchronous height adjustment by rotation of the axle-bearing rods.

7. The motorized lawn mower as claimed in claim 1, wherein the rear wheels are combined to form a roller.

8. The motorized lawn mower as claimed in claim 1, wherein the additional modules can be secured on the frame of the main module by releasable screw connections.

9. The motorized lawn mower as claimed in claim 1, wherein the motor unit is provided with a covering.

10. A hand-operated motorized verticutting implement which is constructed in modular fashion and comprises a main module comprising a rigid frame with a motor bearing, axle bearings and an articulated guide bar, said frame having two longitudinal supports which slope up from front to rear, two rear supports which slope steeply in the downward direction from the rear end of the longitudinal supports, and a rear connecting tube which connects to a plurality of connecting locations of the longitudinal and rear supports, the motor bearing being suspended on the longitudinal supports; and and additional modules which can be fitted and removed individually, wherein at least the following additional modules can be added on to the rigid frame:
a running gear which can be connected to the rigid frame by means of the axle bearings;
a motor unit as drive module;
a verticutting unit;
a hood with an air-stream guide as a channeling system;
and wherein the above-mentioned modules can be combined with one another in an exchangeable manner in different predetermined dimensions and in different constructions.

11. A hand-operated motorized sweeping device which is constructed in modular fashion and comprises a main module comprising a rigid frame with a motor bearing, axle bearings and an articulated guide bar, said frame having two longitudinal supports which slope up from front to rear, two rear supports which slope steeply in the downward direction from the rear end of the longitudinal supports, and a rear connecting tube which connects to a plurality of connecting locations of the longitudinal and rear supports, the motor bearing being suspended on the longitudinal supports; and additional modules which can be fitted and removed individually, wherein at least the following additional modules can be added on to the rigid frame:
a running gear which can be connected to the rigid frame by means of the axle bearings;
a motor unit as drive module;
a sweeping unit;
a hood with an air-stream guide as a channeling system;
and wherein the above-mentioned modules can be combined with one another in an exchangeable manner in different predetermined dimensions and in different constructions.

12. A hand-operated motorized device which is intended for loosening the soil or taking in and blowing out leaves and is constructed in modular fashion and comprises a main module comprising a rigid frame with a motor bearing, axle bearings and an articulated guide bar, said frame having two longitudinal supports which slope up from front to rear, two rear supports which slope steeply in the downward direction from the rear end of the longitudinal supports, and a rear connecting tube which connects to a plurality of connecting locations of the longitudinal and rear supports, the motor bearing being suspended on the longitudinal supports; and additional modules which can be fitted and removed individually, wherein at least the following additional modules can be added on to the rigid frame:
a running gear which can be connected to the rigid frame by means of the axle bearings;
a motor unit as drive module;
a loosening device or a taking-in and blowing-out device;
a hood with an air-stream guide as a channeling system;
and wherein the above-mentioned modules can be combined with one another in an exchangeable manner in different predetermined dimensions and in different constructions.

* * * * *